United States Patent [19]
Yoshida et al.

[11] Patent Number: 5,719,680
[45] Date of Patent: Feb. 17, 1998

[54] COLOR PRINTER AND PRINTING METHOD WITH IMPROVED COLOR REGISTRATION THROUGH SKEU-CORRECTION OF MISALIGNED PRINTING HEADS

[75] Inventors: Kazuyoshi Yoshida; Syuichiro Ogata; Hiroyuki Inoue, all of Tokyo, Japan

[73] Assignee: Oki Electric Industry Co., Ltd., Tokyo, Japan

[21] Appl. No.: 430,660

[22] Filed: Apr. 28, 1995

[30] Foreign Application Priority Data

May 13, 1994 [JP] Japan ............................ 6-099701

[51] Int. Cl.⁶ .................................................. H04N 1/60
[52] U.S. Cl. .................. 358/296; 358/524; 358/523; 358/518; 358/530
[58] Field of Search .................. 347/116; 355/52; 399/39, 49; 358/526, 518, 530, 534, 531, 524, 523

[56] References Cited

U.S. PATENT DOCUMENTS

| | | | |
|---|---|---|---|
| 5,266,976 | 11/1993 | Ohigashi et al. | 347/116 |
| 5,353,044 | 10/1994 | Nakano et al. | 347/211 |
| 5,442,388 | 8/1995 | Schieck | 347/116 |
| 5,485,289 | 1/1996 | Curry | 358/448 |
| 5,594,817 | 1/1997 | Fast et al. | 382/290 |
| 5,600,117 | 2/1997 | Sakamoto | 235/456 |

*Primary Examiner*—Peter S. Wong
*Assistant Examiner*—Derek J. Jardieu
*Attorney, Agent, or Firm*—Panitch Schwarze Jacobs & Nadel, P.C.

[57] ABSTRACT

A color printer has multiple printing heads that print dots in different colors, one dot line at a time. Each line is divided into at least two parts. For each printing head, the printer has an image data memory that stores data for at least two dot lines. When a printing head prints one dot line, data for each part of the dot line are taken from an independently-selected line in the image data memory. The image lines are selected so as to correct positional skew between different printing heads.

19 Claims, 10 Drawing Sheets

FIG. 9

DESKEWING TABLE

| DIRECTION | AMOUNT OF SKEW | STB0 | STB1 | STB2 | STB3 | STB4 | STB5 | STB6 | STB7 |
|---|---|---|---|---|---|---|---|---|---|
| LEFT UP | 0 | 0 | 0 | 0 | 0 | 0 | 0 | 0 | 0 |
|  | 1 | 1 | 1 | 1 | 1 | 0 | 0 | 0 | 0 |
|  | 2 | 2 | 2 | 2 | 1 | 1 | 0 | 0 | 0 |
|  | 3 | 3 | 3 | 2 | 2 | 1 | 1 | 0 | 0 |
|  | 4 | 4 | 3 | 3 | 2 | 2 | 1 | 1 | 0 |
|  | 5 | 5 | 5 | 4 | 3 | 2 | 1 | 0 | 0 |
| LEFT DOWN | 0 | 0 | 0 | 0 | 0 | 0 | 0 | 0 | 0 |
|  | 1 | 0 | 0 | 0 | 0 | 1 | 1 | 1 | 1 |
|  | 2 | 0 | 0 | 1 | 1 | 2 | 2 | 2 | 2 |
|  | 3 | 0 | 1 | 1 | 2 | 2 | 2 | 3 | 3 |
|  | 4 | 0 | 0 | 1 | 2 | 3 | 3 | 3 | 4 |
|  | 5 | 0 | 0 | 1 | 2 | 3 | 4 | 5 | 5 |

COLOR PRINTER AND PRINTING METHOD WITH IMPROVED COLOR REGISTRATION THROUGH SKEU-CORRECTION OF MISALIGNED PRINTING HEADS

BACKGROUND OF THE INVENTION

The present invention relates to a color printing method and a color printer, more particularly to a method of improving color registration in a color printer with multiple printing heads.

The multiple printing heads generate images in different colors such as yellow, magenta, cyan, and black. In an electrophotographic printer, the images are generated on different photosensitive drums and transferred to a sheet of paper (or other printing media) which travels past the drums. The image in each color is created a line at a time, the lines being oriented at right angles to the direction of travel of the paper. The individually-generated images combine to form a full-color image.

A problem in color printers of this type is the difficulty of achieving correct color registration; that is, of mounting the different printing heads so that the images superimpose correctly when combined. A particular problem is aligning the printing heads so that they are mutually parallel. If they are not parallel, image lines in different colors will be mutually skewed, resulting in uneven color rendition.

SUMMARY OF THE INVENTION

It is accordingly an object of the present invention to improve color registration in a color printer.

The invented color printer has a plurality of printing heads for generating images in different colors, which are printed in a superimposed fashion on a printing medium. Each image is generated one line at a time, each line consisting of at least two parts.

For each printing head, the printer has an image data memory that stores data for at least two image lines. When a printing head prints one line, a data selector selects data for each part of the line independently from one of the image lines stored in the image data memory. The selection is controlled by a deskewing unit according to positional skew of the printing head with respect to other printing heads.

BRIEF DESCRIPTION OF THE DRAWINGS

FIG. 9 shows a deskewing table.

DETAILED DESCRIPTION OF THE INVENTION

Figure 1:
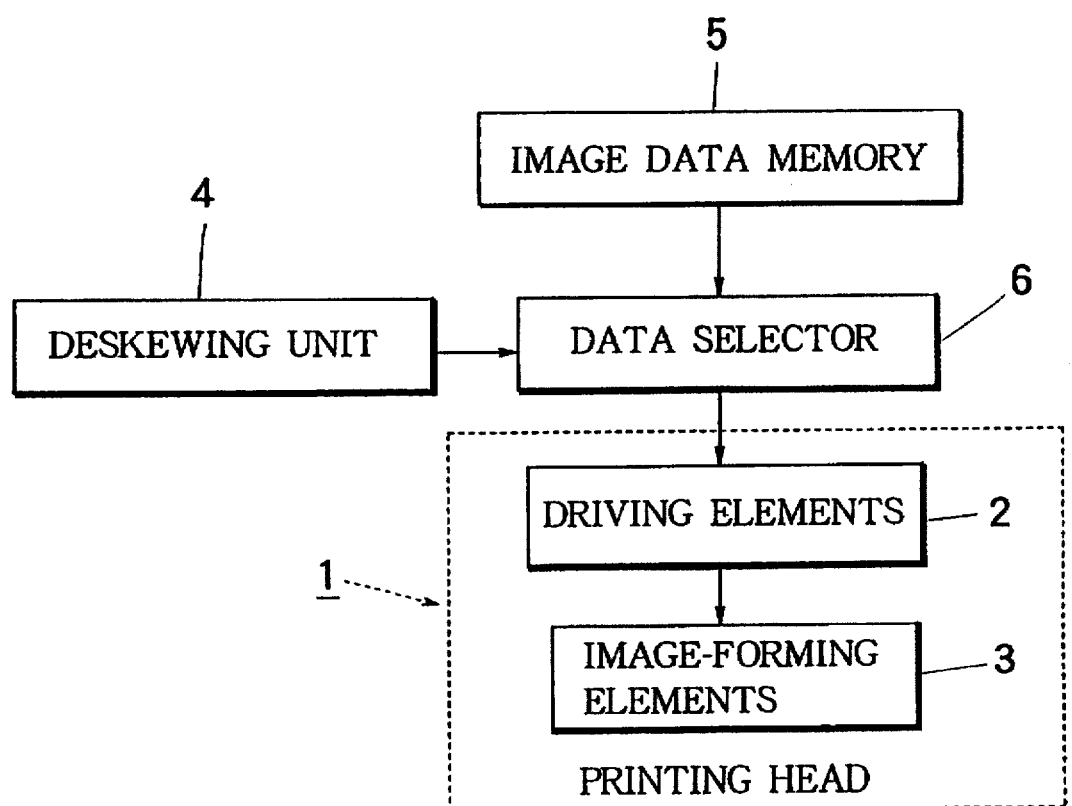
FIG. 1 is a functional block diagram showing the basic elements in the invented printing method.

An embodiment of the invention will now be described in detail with reference to the attached illustrative drawings. The embodiment is a color electrophotographic printer in which the printing heads are LED heads incorporating light-emitting diodes (LEDs). All signals shown in the drawing are logic-level signals that are active high.

FIG. 1 shows the basic elements in the invented printing method. The printer comprises a plurality of printing heads 1, only one of which is shown in the drawing. Each printing head 1 comprises a plurality of driving elements 2 and a like plurality of image-forming elements 3.

Printing is controlled by a deskewing unit 4 that is programmed according to the skew between different printing heads. Data to be supplied to printing head 1 are stored in an image data memory 5, which stores data for a certain number of consecutive image lines. A data selector 6 selects data from the image data memory 5 according to the settings of the deskewing unit 4, thereby compensating for head skew, and supplies the selected data to the printing head 1.

Figure 2:
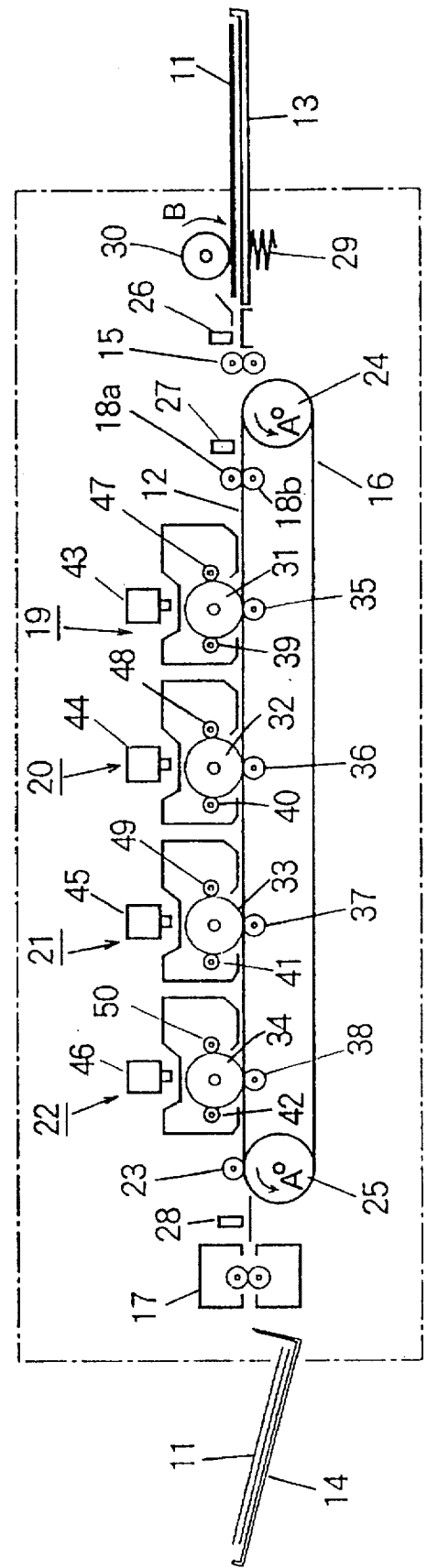
FIG. 2 shows the mechanical configuration of a color electrophotographic printer.

FIG. 2 shows the mechanical structure of the printer. Paper 11 is transported through the printer on a path 12 having a paper cassette 13 at one end and a stacker 14 at the other end. A registration roller 15, carrier belt 16, and fuser unit 17 are disposed along the path 12 between the paper cassette 13 and stacker 14. A paper charging unit 18a, belt charging unit 18b, yellow printing unit 19, magenta printing unit 20, cyan printing unit 21, black printing unit 22, and discharging unit 23 are disposed in the stated order along the carrier belt 16, the path 12 threading through these elements. The carrier belt 16 is driven by a pair of drive rollers 24 and 25 that turn in the direction of arrow A. Paper sensors 26, 27, and 28 are disposed near the registration roller 15, paper charging unit 18a, and fuser unit 17. The paper cassette 13 is pressed upward by a spring 29, so that the top sheet of paper 11 in the cassette 13 is pressed against a so-called hopping roller 30 that turns in the direction of arrow B. The printing units 19 to 22 comprise respective photosensitive drums 31 to 34 and transfer units 35 to 38, the path 12 leading between each photosensitive drum and its associated transfer unit. Charging electrodes 39 to 42, LED heads 43 to 46, and developer units 47 to 50 are disposed around respective photosensitive drums 31 to 34.

Figure 3:
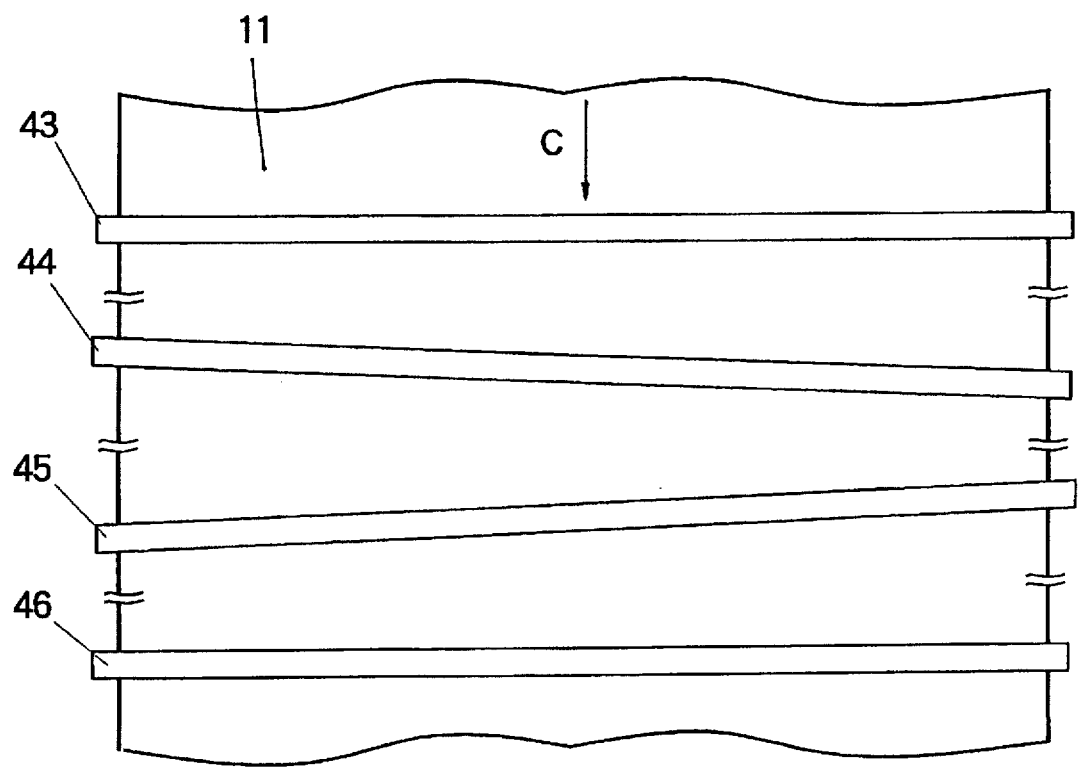
FIG. 3 illustrates skewed positional relationships of four printing heads.

FIG. 3 illustrates typical positional relationships of the four LED heads as seen from above. The paper 11 travels in the direction of arrow C. The LED heads 43, 44, 45, and 46 are all installed at substantially perpendicular angles to the direction of paper travel C, but manufacturing tolerances allow slight deviations from exact perpendicularity, so in general the heads will be slightly skewed with respect to one another, as shown. In the drawing, the yellow and black heads 43 and 46 are exactly perpendicular to the paper transport direction C, and the magenta and cyan heads 44 and 45 are skewed. Exaggerated amounts of skew are shown for clarity.

Figure 4:
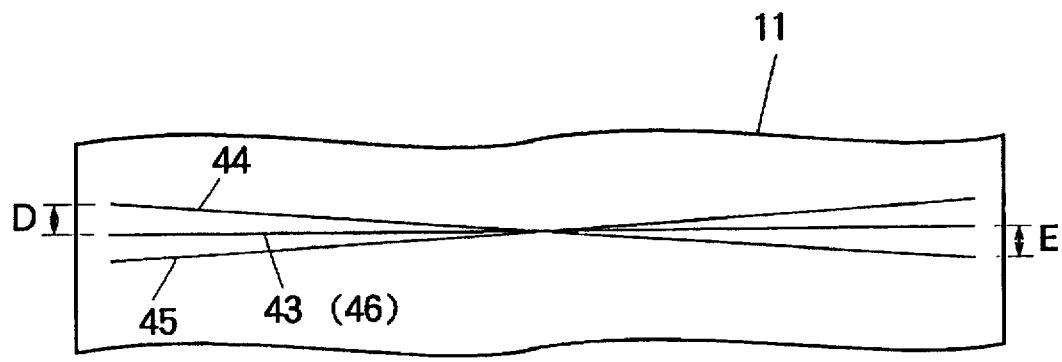
FIG. 4 illustrates the definition of skew.

The amount of skew can be defined as shown in FIG. 4. The three lines illustrate the relative orientations of the magenta head 44, yellow and black heads 43 and 46, and cyan head 45. The amount of skew between the magenta head 44 and the yellow or black head 43 or 46 is the sum of the deviations D and E at the ends of the respective lines.

Figure 5:
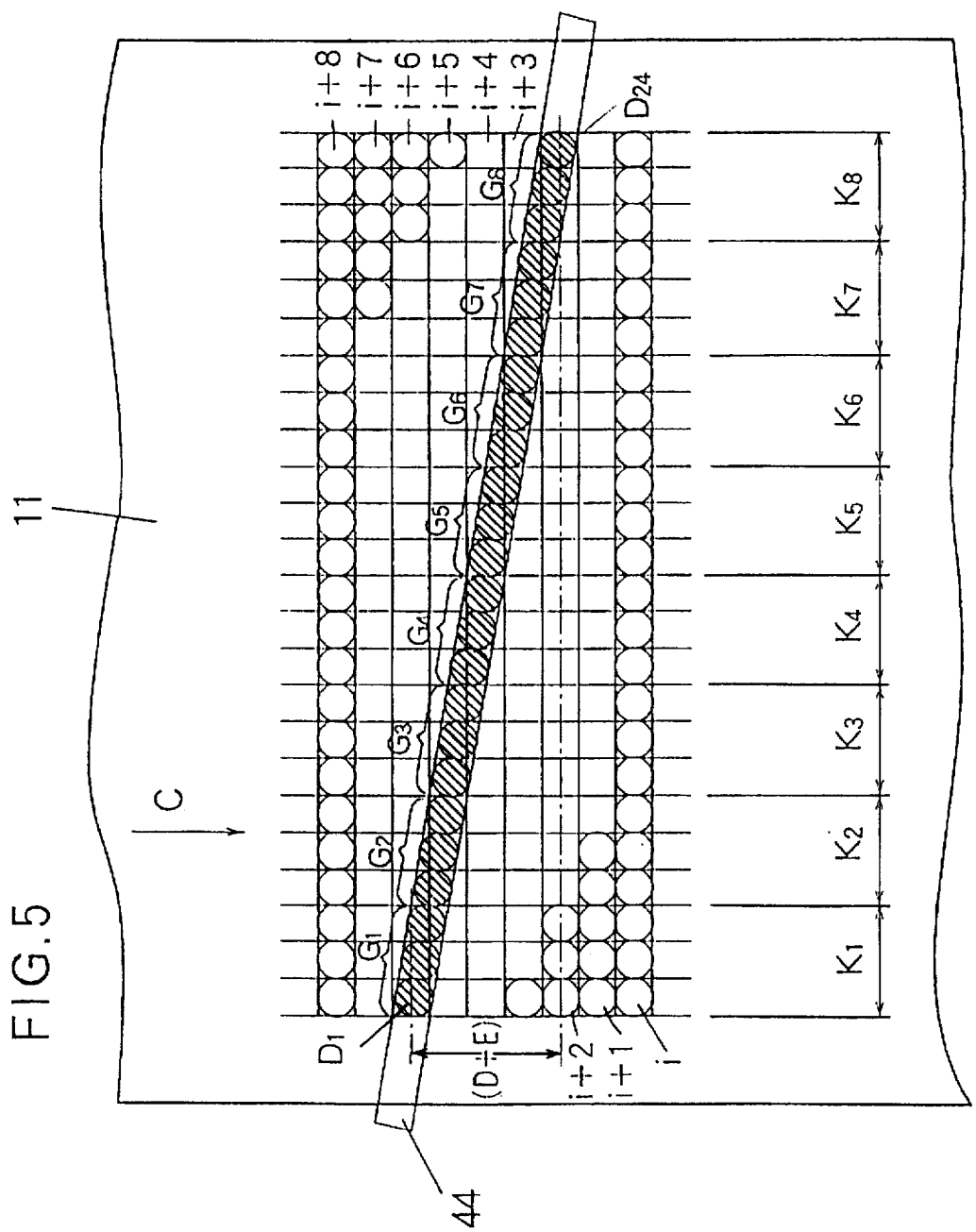
FIG. 5 illustrates the basic concept of the invented printing method.

FIG. 5 illustrates the basic concept of the invented printing method, taking the magenta head 44 as an example. The white circles on the paper 11 represent dots printed by the preceding yellow head 43. The yellow image consists of successive image lines numbered in the drawing from i to i+8 in the direction C of paper transport. For the sake of visibility, each image line in the drawing is shown as having a width of twenty-four dots. The magenta image consists of similar image lines. For correct printing, the i-th magenta line must be superimposed on the i-th yellow line, the (i+1)-th magenta line on the (i+1)-th yellow line, and so on.

Each LED head comprises a linear array of twenty-four LEDs $D_1$ to $D_{24}$, each LED generating one dot per image line. Because the magenta head 44 is skewed by D+E, it straddles four yellow image lines, from line i+2 to line i+6. The amount of skew is four dots, the left end being skewed up and the right end skewed down.

Each LED head is divided into eight parts, each part comprising a group of three LEDs. The parts are numbered $G_1$ to $G_8$ in the drawing. The dot data for each image line can be divided into three-dot portions $K_1$ to $K_8$ which are supplied to corresponding parts of the LED head.

To correct the skew of the magenta head 44, in the position shown in the drawing, data $K_1$ from magenta image line i+6 are supplied to part $G_1$ of the magenta head 44; parts $G_2$ and $G_3$ receive data $K_2$ and $K_3$ from image line i+5; parts $G_4$ and $G_5$ receive data $K_4$ and $K_5$ from image line i+4; parts $G_6$ and $G_7$ receive data $K_6$ and $K_7$ from image line i+3; and part $G_8$ receives data $K_8$ from image line i+2. After the paper has advanced by one dot, these image line values are all incremented by one. If the magenta image is printed in this way, it will be correctly superimposed on the yellow image.

Figure 6:
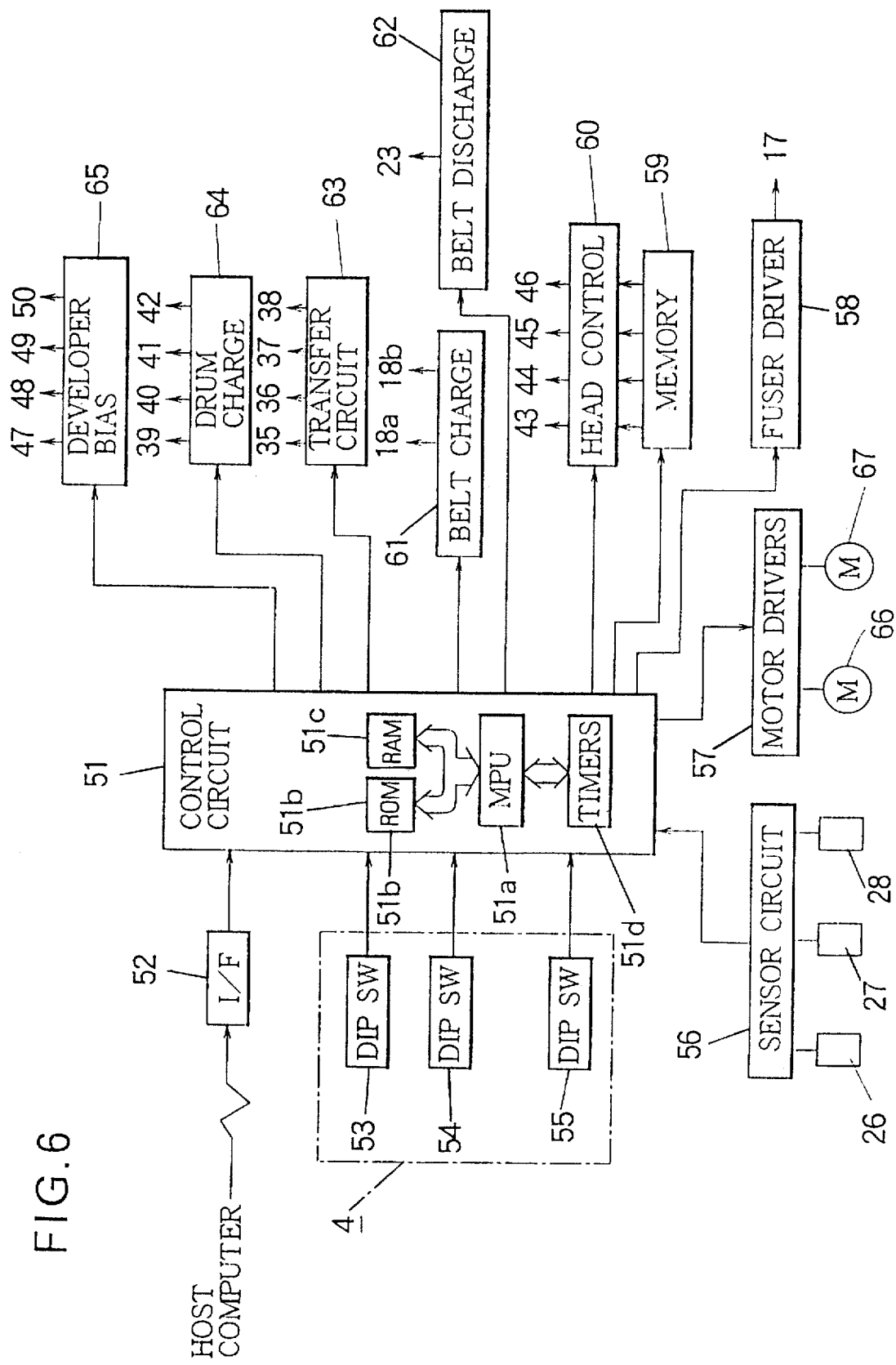
FIG. 6 is a block diagram of the control system of the printer in FIG. 2.

FIG. 6 is a block diagram of the printer's control system. Connections to elements in FIG. 2 are indicated by the reference numerals used in FIG. 2.

The control system comprises a control circuit S1 having a microprocessor (MPU) 51a, read-only memory (ROM) 51b, random-access memory (RAM) 51c, timers 51d, and other facilities. Coupled to the control circuit 51 are an interface circuit 52, DIP switches 53 to 55, a sensor circuit 56, a motor driving circuit 57, a fuser driver 58, a memory circuit 59, a head control circuit 60, a belt charge circuit 61, a belt discharge circuit 62, a transfer circuit 63, a drum charge circuit 64, a developer bias circuit 65, and various other circuits not shown in the drawing, such as circuits for interfacing to a control panel.

DIP switches 53 to 55, together with the deskewing table to be shown in FIG. 9, form the deskewing unit 4 in this embodiment. Incidentally, DIP is an abbreviation of dual in-line pin. A DIP switch is a switch unit that is similar in size to the common dual-in-line-pin semiconductor package, and has one or more individual switches. Each individual switch can be set to two positions, designating the binary logic values zero and one in the present embodiment.

An external host computer is coupled to the input side of the interface circuit 52. Paper sensors 26 to 28 are coupled to the input side of the sensor circuit 56. A paper transport motor 66 and hopping roller drive motor 67 are coupled to the output side of the motor driving circuit 57. The fuser unit 17 is coupled to the output side of the fuser driver 58. The LED heads 43 to 46 are coupled to the output side of the head control circuit 60. The paper charging unit 18a and belt charging unit 18b are coupled to the output side of the belt charging circuit 61. The discharging unit 23 is coupled to the output side of the belt discharging circuit 62. The transfer units 35 to 38 are coupled to the output side of the transfer circuit 63. The charging electrodes 39 to 42 are coupled to the output side of the drum charging circuit 64. The developer units 47 to 50 are coupled to the output side of the developer bias circuit 65.

Figure 7:
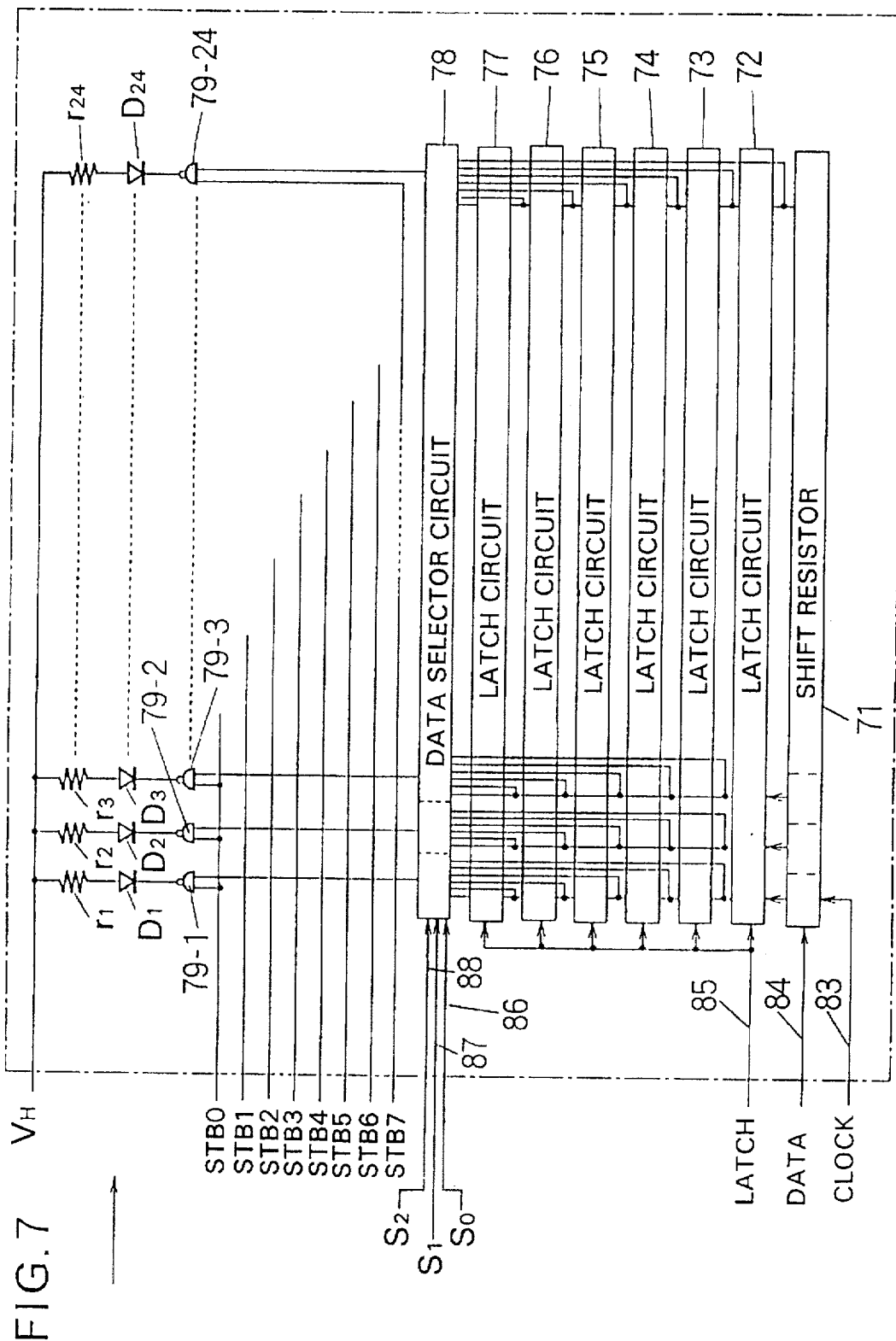
FIG. 7 is a block diagram of the circuits associated with a printing head.

FIG. 7 shows the configuration of one LED head and its associated memory and selection circuits. These include a shift register 71 and latch circuits 72 to 77 for storing data, and a data selector circuit 78 for selecting the data stored in the latch circuits 72 to 77. NAND gates 79-1 to 79-24 are coupled on their input sides to the data selector circuit 78 and on their output sides to respective LEDs $D_1$ to $D_{24}$. Each NAND gate 79-n (n=1 to 24) is also coupled to one of eight strobe signal lines STB0 to STB7. The LEDs $D_1$ to $D_{24}$ are coupled to respective current-limiting resistors $r_1$ to $r_{24}$.

The data selector circuit 78 forms the data selector 6 in this embodiment. The NAND gates 79-1 to 79-24 act as the driving elements 2 in FIG. 1. The latch circuits 72 to 77 form the image data memory 5.

Figure 8:
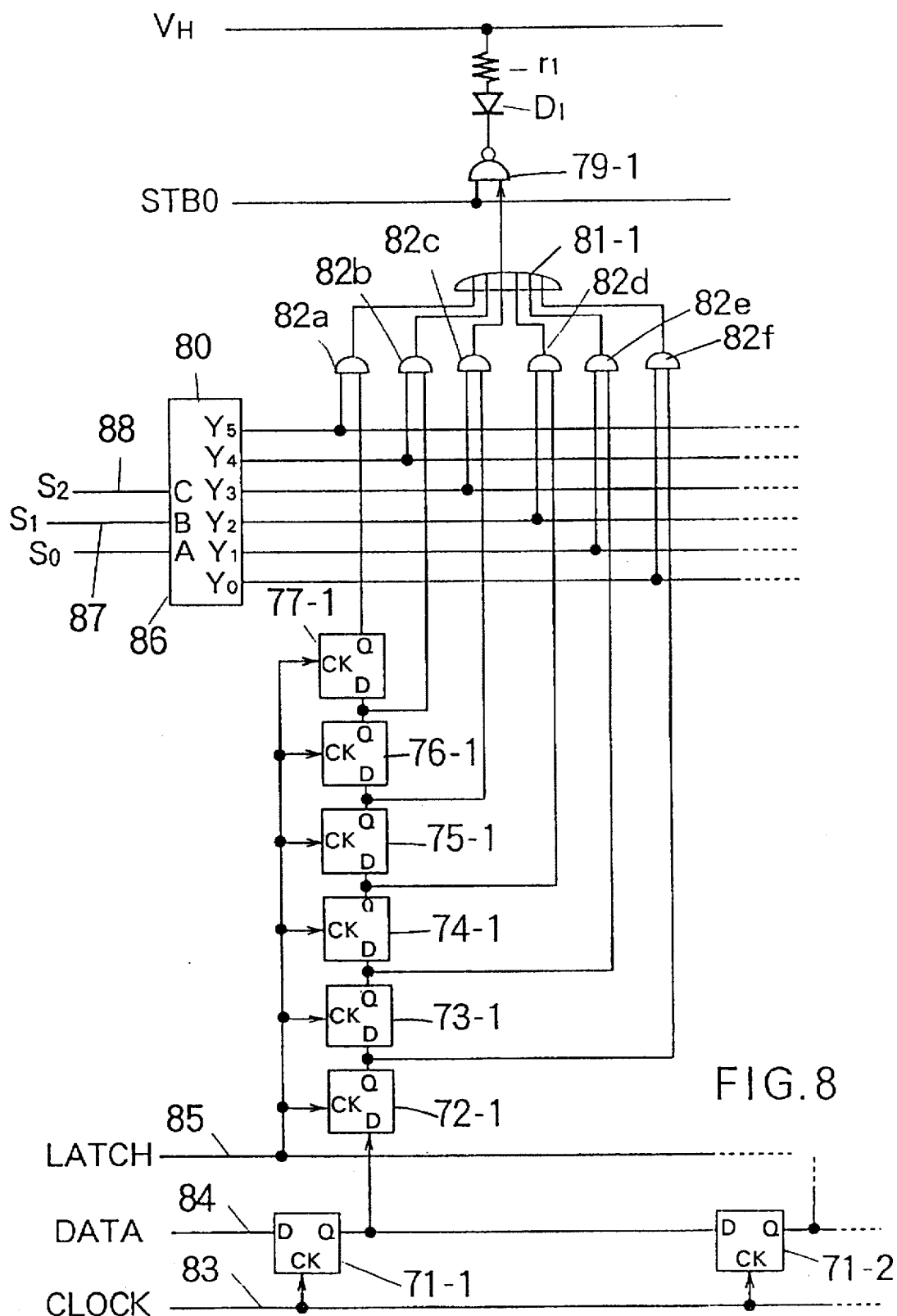
FIG. 8 is a more detailed diagram of the circuit for driving one light-emitting diode in FIG. 7.

The data selector circuit 78 in FIG. 7 comprises the decoder 80 shown in FIG. 8, as well as twenty-four six-input OR gates and, for each OR gate, six coupled AND gates. FIG. 8 shows the OR gate 81-1 and AND gates 82a to 82f associated with the first LED $D_1$.

Next the further structure and interconnections of the circuits in FIGS. 7 and 8 will be described.

The shift register 71 in FIG. 7 comprises a cascaded series of twenty-four flip-flops, of which the first two flip-flops 71-1 and 71-2 are shown in FIG. 8. The data output terminal Q of each flip-flop 71-n (n=1 to 23) is coupled to the data input terminal D of the next flip-flop 71-(n+1). The clock input terminal CK of each flip-flop 71-n (n=1 to 24) is coupled to a clock signal line 83. The data input terminal D of the first flip-flop 71-1 is coupled to a data signal line 84.

The latch circuits 72 to 78 also comprise twenty-four flip-flops apiece, of which he first flip-flop in each latch circuit is shown in FIG. 8. These flip-flops 72-1, 73-1, 74-1, 75-1, 76-1, and 77-1 are cascaded in the vertical direction in the drawing, the output terminal Q of each flip-flop being coupled to the input terminal D of the next flip-flop. The input terminal D of the flip-flop 72-1 in latch circuit 72 is coupled to the corresponding flip-flop 71-1 in shift register 71. The clock input terminals CK of all of the flip-flops in the latch circuits 72 to 76 are coupled to a common latch signal line 85. The clock, data, and latch signal lines 83, 84, and 85 are coupled to the head control circuit 80 in FIG. 6. The output terminals Q of flip-flops 77-1 to 72-1 are also coupled to corresponding AND gates 82a to 82f.

The decoder 80 has three input terminals A, B, and C, which are coupled to signal lines 86, 87, and 88, and six output terminals $Y_0$ to $Y_5$, which are coupled to respective AND gates 82f to 82a. Signal lines 86, 87, and 88 receive signals $S_0$, $S_1$, and $S_2$ from the head control circuit 60. The outputs of the AND gates 82f to 82a are coupled to the six input terminals of OR gate 81-1. The output terminal of OR gate 81-1 is coupled to one input of NAND gate 79-1. The other input of NAND gate 79-1 is coupled to one of the strobe signal lines, in this case STB0. The output of NAND gate 79-1 is coupled to the cathode of light-emitting diode $D_1$. The anode of light-emitting diode $D_1$ is coupled through current-limiting resistor $r_1$ to a power supply line $V_H$.

The eight strobe signal lines STB0 to STB7 correspond to the eight parts of the LED head. STB0 is coupled to the three NAND gates 79-1, 79-2, and 79-3 that drive the three light-emitting diodes $D_1$, $D_2$, and $D_3$ in part $G_1$. STB1 is coupled to the three NAND gates that drive the LEDs in part $G_2$, and so on through STB7, which is coupled to the three NAND gates that drive the LEDs in part $G_8$.

FIG. 9 shows a deskewing table that is stored in the ROM 51b of the control circuit 51. The two left-most columns in FIG. 9 are skew values indicating amount and direction of skew, as specified by any of the DIP switches 53 to 55. The skew direction is specified by one bit of information, e.g. logic zero specifying left-down skew, and logic one left-up skew. The amount of skew corresponds to the quantity D+E shown in FIG. 4. The table in FIG. 9 provides for correction of skew of up to five dots in either direction.

For each skew value (amount and direction of skew), the table contains an entry specifying an image line to be selected by signals $S_0$, $S_1$, and $S_2$ when each strobe line from STB0 to STB7 is activated. For example, an entry of four under STB0 indicates that $S_2$, $S_1$, and $S_0$ should have logic levels of one, zero, and zero, respectively, when strobe signal STB0 is active, "100" being the binary representation of "four."

Next the printing operation will be described.

First of all, when the printer is manufactured, color registration tests are carried out to detect head skew and make the optimum skew-value settings of DIP switches 53, 54, and 55. For example, test images comprising only yellow and magenta dots can be printed with different settings of DIP switch 53 to find the setting that gives the best result. The same procedure can be repeated with a yellow-and-cyan image to find the best setting of DIP switch 54, and with a yellow-and-black image to find the best setting of DIP switch 55.

The settings of the DIP switches correspond to the values in the left-most two columns in FIG. 9. For example, if the magenta head is skewed four dots in the left-up direction, DIP switch 53 should be set to "1100," where the first "1" indicates the left-up direction and the following "100" indicates the amount of skew.

During normal use, printing is initiated when the host computer starts sending printing commands and data. The control circuit 51 receives these via the interface circuit 52 and stores them in the memory circuit 59. When a page is ready to be printed, the control circuit 51 commences the sequence of operations shown in FIG. 10.

Figure 10:
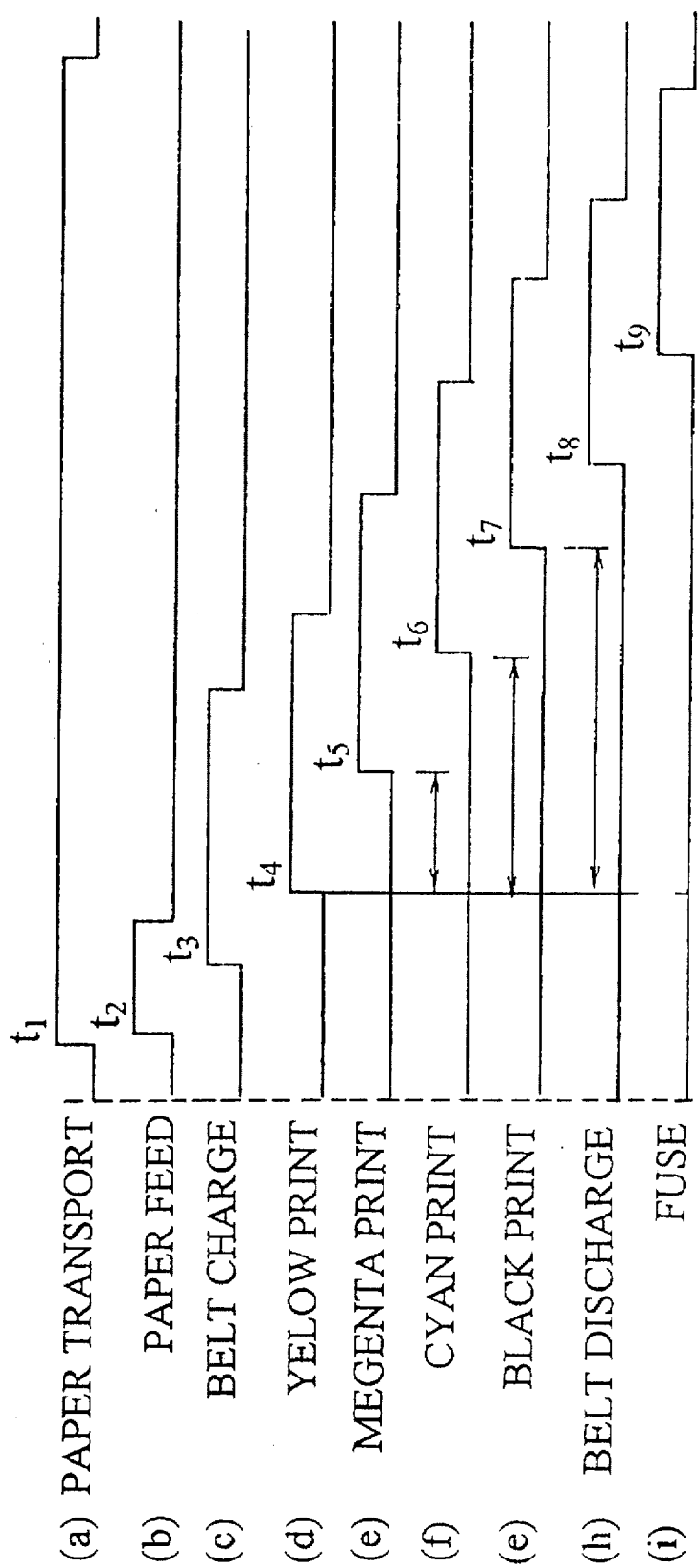
FIG. 10 is a timing diagram illustrating color printing operations.

At time $t_1$ in FIG. 10 the control circuit 51 activates the paper transport motor 66, which begins turning the drive rollers 24 and 25 in the direction of arrow A in FIG. 2, thereby driving the carrier belt 16. At time $t_2$ the control circuit 51 activates the hopping motor 67, which turns the hopping roller in the direction of arrow B in FIG. 2, feeding a sheet of paper 11 from the cassette 13 into the path 12. The sheet of paper 11 is fed past paper sensor 26, registration roller 15, and paper sensor 27 to the carrier belt 16. At time $t_3$ the control circuit 51 activates the charging circuit 61, causing the paper charging unit 18a and belt charging unit 18b to create an electrostatic charge on the paper 11 and carrier belt 16.

At time $t_4$, control circuit 51 activates the yellow printing unit 19 to start printing a yellow image. At time $t_5$, the magenta printing unit 20 is activated to start printing a magenta image. At time $t_6$, the cyan printing unit 21 is activated to start printing of a cyan image. At time $t_7$, the black printing unit 22 is activated to start printing a black image. Images are formed on the photosensitive drums 31 to 34, developed by application of yellow, magenta, cyan, and block toner from the developer units 47 to 50, and transferred to the paper 11 by the transfer units 35 to 38.

The sending of image data to the four printing heads is staggered as indicated in FIG. 10: yellow image data for the first line on the page are sent at time $t_4$, magenta image data for this line at time $t_5$, cyan image data at time $t_6$, and black image data at $t_7$. The offsets between timings $t_4$, $t_5$, $t_6$, and $t_7$ correspond in part to the distances between the printing heads, and can be adjusted on the basis of the same color registration tests as were used to determine the optimum deskewing settings.

At time $t_8$ the discharging circuit 62 is activated to discharge the carrier belt 16 and paper 11. At time $t_9$, the fuser driver 58 is activated and the fuser unit 17 fuses the toner images onto the paper 11 by a combination of pressure and heat. The paper 11 is then deposited in the stacker 14.

Figure 11:
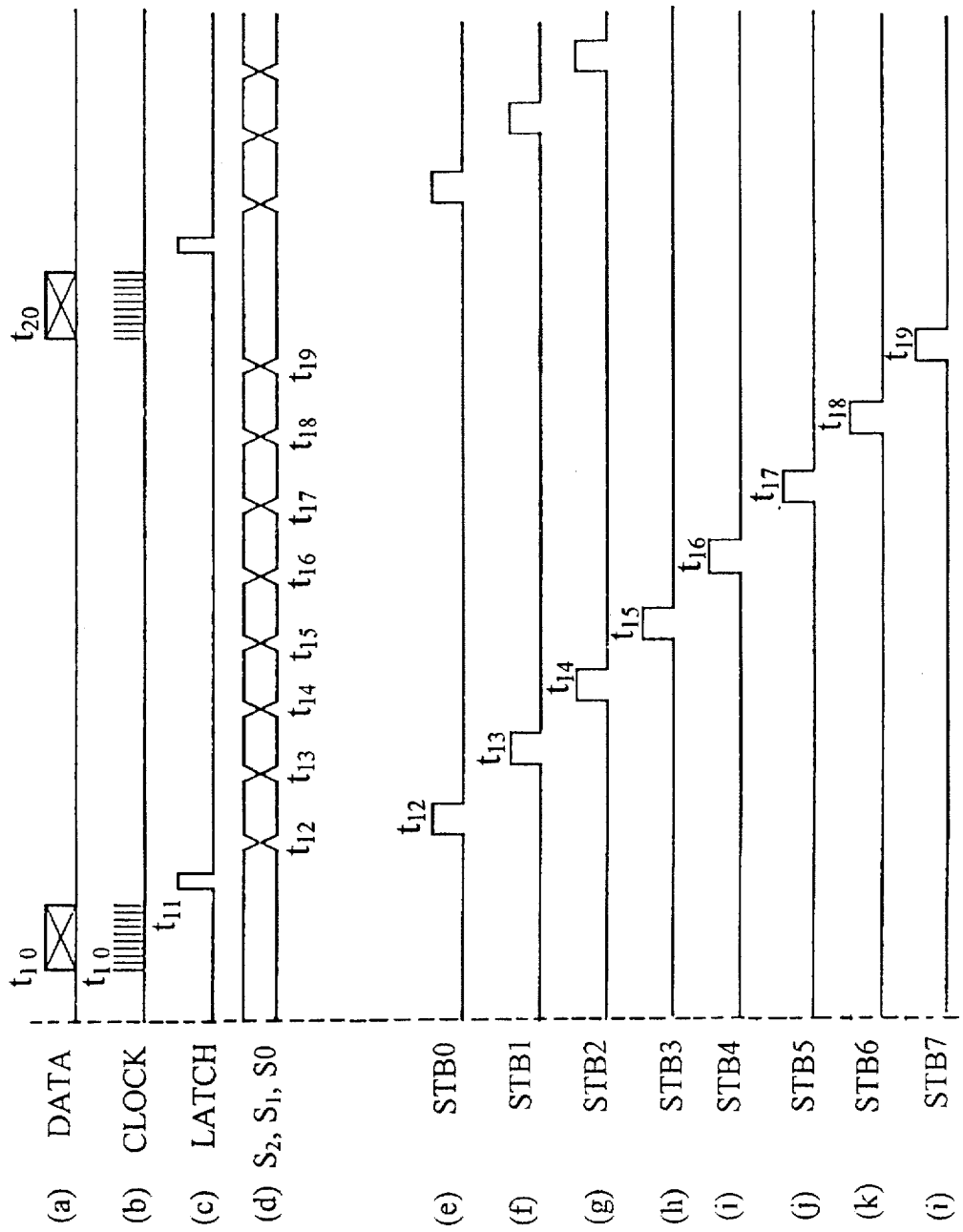
FIG. 11 is a timing diagram illustrating the operation of one printing head.

FIG. 11 illustrates the sequence of operations in one LED head. Operation of the magenta head 44 will be described as an example, operation of the other three heads being similar.

At time $t_{10}$, the head control circuit 60 begins sending image data on the data line 84 and clock signals on the clock signal line 83. The data are shifted into the shift register 71. After data for one complete image line (twenty-four dots) have been loaded into shift register 71, the head control circuit 60 stops sending data and clock signals.

After the shift register 71 has been loaded, at time $t_{11}$ the head control circuit 60 outputs an active pulse on the latch signal line 85. In response to this latch signal, latch circuit 77 latches the data that were held in latch circuit 76, latch circuit 76 latches the data that were held in latch circuit 75, and so on, latch circuit 72 latching the new data loaded into the shift register 71. The data stored in the latch circuits are thereby shifted forward by one image line.

At times $t_{12}$ to $t_{19}$, the head control circuit 60 outputs signals $S_2$, $S_1$, and $S_0$ on signal lines 86 to 88 according to data taken from the deskewing table by the microprocessor 51a. If DIP switch 53 is set to "1100," for example, the microprocessor 51a reads the DIP switch, looks up the corresponding entry in the deskewing table, which in FIG. 9 is [4, 3, 3, 2, 2, 1, 1, 0], and sends these selection data to the head control circuit 60. The head control circuit 60 outputs signals $S_2$, $S_1$, and $S_0$ with corresponding logic levels at times $t_{12}$ to $t_{19}$, in the sequence [100, 011, 011, 010, 010, 001, 001, 000], in synchronization with strobe signals STB0 to STB7.

The decoder 80 decodes the $S_2$, $S_1$, and $S_0$ values and drives its output lines to the logic-one level in the sequence $[Y_4, Y_3, Y_3, Y_2, Y_2, Y_1, Y_1, Y_0]$. The NAND gates 79-1 to 79-24 accordingly receive data from latch circuit 76 at time $t_{12}$ when strobe signal STB0 is active, from latch circuit 75 at times $t_{13}$ and $t_{14}$ when strobe signals STB1 and STB2 are active, from latch circuit 74 at times $t_{15}$ and $t_{16}$ when STB3 are STB4 are active, from latch circuit 73 at times $t_{17}$ and $t_{18}$ when STB5 and STB6 are active, and from latch circuit 72 at time $t_{19}$ when STB7 is active.

More specifically, at time $t_{12}$ decoder output $Y_4$ is high (logic one), and the other decoder output signals are low (logic zero). As a result, the output of AND gate 82b in FIG. 8 is the same as the output of flip-flop 76-1 in latch circuit 76, and the outputs of the other five AND gates 82a, 82c, 82d, 82e, and 82f are all low. The output of OR gate 81-1 is therefore the same as the output of flip-flop 76-1 in latch circuit 76, and NAND gate 79-1 receives data from latch circuit 76. Similar operations provide data from latch circuit 76 to the other NAND gates 79-2 to 79-24.

Also at time $t_{12}$, strobe signal STB0 is high and the other strobe signals are low. Accordingly, the outputs of the NAND gates 79-1, 79-2, and 79-3 corresponding to LED group $G_1$ become responsive to the data in latch circuit 76. A high input to NAND gate 79-1, 79-2, or 79-3 from latch circuit 76 causes the NAND output to go low, allowing current to flow through the corresponding light-emitting diode $D_1$, $D_2$, or $D_3$, which turns on and generates an image dot by illuminating the photosensitive drum 32. The outputs of the other NAND gates 79-4 to 79-24 are held high, so no current flows through LEDs $D_4$ to $D_{24}$.

Similarly, at time $t_{13}$ strobe signal STB1 is activated, and the LEDs in group $G_2$ generate image dots from the latch circuit 75 selected by signals $S_2$, $S_1$, and $S_0$. At time $t_{14}$ the LEDs in group $G_3$ also generate image dots from the data in latch circuit 75. At times $t_{15}$ and $t_{16}$ the LEDs in groups $G_4$ and $G_5$ generate image dots from the data in latch circuit 74. At times $t_{17}$ and $t_{18}$ the LEDs in groups $G_6$ and $G_7$ generate image dots from the data in latch circuit 73, and at time $t_{19}$ the LEDs in group $G_8$ generate image dots from the data in latch circuit 72.

At time $t_{20}$ in FIG. 11, the paper 11 has traveled a distance of one dot along the path 12. The head control circuit 60 again begins sending data and clock signals to load another image line into shift register 71, and the above operations are repeated. Further repetitions follow, synchronized with the motion of the paper, until the entire page has been printed. The result is a printed image with correct color registration everywhere on the page.

As described above, color registration can be adjusted easily during the manufacturing process, by printing a few test pages and setting DIP switches. This eliminates the need for tight mechanical manufacturing tolerances, which are difficult and expensive to implement. The invented method of color registration thus simplifies the manufacturing process and lowers the cost of the printer, yet delivers printing with accurate color registration.

If color registration drifts out of adjustment during the service life of the printer, correct adjustment can be restored by changing the settings of the DIP switches. This readjustment requires no special skill or equipment, and can be carried out easily by the user.

The invention is not restricted to the embodiment described above. Some possible variations are described below.

Instead of using DIP switches, the deskewing unit 4 can be implemented as a non-volatile memory in the control circuit. Color registration can then be adjusted by writing appropriate data in a deskewing table in this memory. This scheme has the advantage of not needing external switches, and the deskewing table requires only one entry per printing head, but provisions must be made for accessing the non-volatile memory. The microprocessor 51a, for example, can be programmed to update the non-volatile memory contents in response to commands from the host computer.

The width of the image lines is of course not limited to the twenty-four dots shown in the drawings. Much larger numbers of dots are typical, e.g. two thousand five hundred sixty dots for a printer that prints three hundred dots per inch on A4-size paper.

The image data memory 5 is not limited to storing data for six image lines. The invention can be practiced by storing data for any number of images lines equal to or greater than two. Storing more image lines in the image data memory 5 enables larger amounts of skew to be corrected.

The number of strobe signals is not limited to eight. Larger numbers of strobe signals can be used for more accurate skew correction.

The method of selecting data from different image lines is not limited to the configuration of logic gates and signals shown in the drawings. For example, the microprocessor 51a could be programmed to make the selection when reading data from the memory circuit 59.

The printer need not be an electrophotographic printer. The invention can also be practiced with, for example, thermal transfer color printing methods.

What is claimed is:

1. A color printer having a plurality of printing heads for generating images in different colors, data for each image being generated one image line at a time, said images being printed in a superimposed fashion on a printing medium, separately comprising, for each printing head:

an image data memory for storing the data for at least two image lines; and a data selector coupled to said image data memory, for selecting data from said image data memory and supplying the data thus selected to said printing head one line at a time, said one line having at least two fixed parts, each fixed part comprising data taken from an independently selected image line in said image data memory; and further comprising a deskewing unit for controlling said data selector by designating, for each said fixed part of said one line, the image line in said image data memory from which data for that fixed part are taken, thereby correcting for skew of said printing head.

2. The color printer of claim 1, wherein said printing medium is transported in a direction substantially perpendicular to the image line generated by each of said printing heads.

3. The color printer of claim 1, wherein said image data memory shifts lines of data stored therein in synchronization with motion of said printing medium.

4. The color printer of claim 1, wherein said deskewing unit comprises a non-volatile memory.

5. The color printer of claim 1, wherein each of said printing heads separately comprises a plurality of image-forming elements disposed in a linear array, each of said image-forming elements generating one dot per image line.

6. The color printer of claim 1, wherein said deskewing unit comprises at least one switch.

7. The color printer of claim 6, wherein:

said switch designates a skew value; and said deskewing unit determines, from said skew value, the image line from which data for each fixed part are taken.

8. The color printer of claim 7, wherein said switch is operable by a human user of said color printer, permitting said human user to adjust color registration of said color printer.

9. The color printer of claim 1, wherein:

each said image line comprises a plurality of dots;

said one line comprises a like plurality of dots;

said image data memory comprises a cascaded series of latch circuits; and each of said latch circuits stores data for one image line among said image lines.

10. The color printer of claim 9, wherein:

each of said latch circuits comprises a plurality of flip-flops;

each of said flip-flops stores data for one dot; and the flip-flops in each one of said latch circuits are coupled to corresponding flip-flops in a different one of said latch circuits, thereby cascading said series of latch circuits.

11. The color printer of claim 9, wherein said data selector comprises, for each dot in said one line, a plurality of first logic gates coupled to respective latch circuits, for receiving data stored in said latch circuits, and a second logic gate coupled to said first logic gates, for receiving data from one of said latch circuits as selected by said first logic gates.

12. The color printer of claim 11, wherein said data selector also comprises, for each of said fixed parts of said one line, a plurality of third logic gates coupled to respective second logic gates and controlled by a single strobe signal, for controlling supply of the data selected by said first logic gates to said printing head.

13. A method of color printing that employs a plurality of printing heads to generate images in respective colors, data for each image being generated one image line at a time, and prints said images in a superimposed fashion on a printing medium, comprising the steps of:

(a) determining mutual positional skew values of said priming heads;

(b) dividing each printing head among said printing heads into at least two fixed parts based on the determined values;

(c) storing the data for multiple image lines for each of said printing heads;

(d) selecting for each said printing head and for each fixed part among said fixed parts, data for one image line stored in said step (c); and (e) supplying the data thus selected to corresponding fixed parts of said printing heads.

14. The method of claim 13, wherein said step (d) comprises reading a deskewing table with entries for different skew values, each entry specifying an image line for each of said fixed parts.

15. The method of claim 13, wherein said step (d) comprises, for each printing head among said printing heads, the further steps of:

(d1) selecting a particular image line;

(d2) selecting a particular part of said printing head;

(d3) driving said particular part of said printing head according to data from said particular image line; and (d4) repeating steps (d1), (d2), and (d3) for different parts of said printing head until all parts of said printing head have been driven.

16. The method of claim 13, comprising the further step of setting switches according to said skew values, said switches controlling how data are selected in said step (d).

17. The method of claim 13, comprising the further step of storing said skew values in a non-volatile memory for use in controlling how data are selected in said step (d).

18. The method of claim 13, wherein each of said image lines comprises a certain number of dots, which are printed by separate image-generating elements in said printing heads, and said step (c) comprises storing data for each of said dots in a cascaded series of flip-flops.

19. The method of claim 18, comprising the further steps of transporting said printing medium in a direction substantially perpendicular to said image lines; and shifting data in each said series of flip-flops, in synchronization with motion of said printing medium.

* * * * *